United States Patent
Sunahara (10) Patent No.: US 9,502,977 B2
(45) Date of Patent: Nov. 22, 2016

(54) CONTROL APPARATUS FOR VOLTAGE CONVERTING APPARATUS

(71) Applicant: TOYOTA JIDOSHA KABUSHIKI KAISHA, Toyota-shi, Aichi (JP)

(72) Inventor: Shohei Sunahara, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 111 days.

(21) Appl. No.: 14/370,613

(22) PCT Filed: Jan. 24, 2013

(86) PCT No.: PCT/JP2013/051463
§ 371 (c)(1),
(2) Date: Jul. 3, 2014

(87) PCT Pub. No.: WO2013/111821
PCT Pub. Date: Aug. 1, 2013

(65) Prior Publication Data
US 2014/0361757 A1  Dec. 11, 2014

(30) Foreign Application Priority Data

Jan. 25, 2012 (JP) ................................. 2012-012742

(51) Int. Cl.
*H02M 7/5387* (2007.01)
*H02M 3/158* (2006.01)
(Continued)

(52) U.S. Cl.
CPC ................ *H02M 3/158* (2013.01); *B60L 7/14* (2013.01); *B60L 11/005* (2013.01); *B60L 11/123* (2013.01);
(Continued)

(58) Field of Classification Search
CPC ............ H02M 7/5387; H02M 7/53871; H02M 7/53875; H02M 3/156–3/158; H02M 3/1563; H02M 3/1588
(Continued)

(56) References Cited

U.S. PATENT DOCUMENTS 8,575,875 B2 * 11/2013 Takamatsu .......... B60L 11/1803
180/65.265
2009/0323375 A1  12/2009 Galvano et al.
2012/0049774 A1  3/2012 Takamatsu et al.

FOREIGN PATENT DOCUMENTS

JP  2006-74932   3/2006
JP  2006-254593  9/2006
(Continued)

*Primary Examiner* — Yemane Mehari
(74) *Attorney, Agent, or Firm* — Finnegan, Henderson, Farabow, Garrett & Dunner, LLP (57) ABSTRACT

A control apparatus (30) for a voltage converting apparatus controls a voltage converting apparatus (12) configured to realize one-arm drive by alternatively switching on first and second switching elements (Q1, Q2). The control apparatus for the voltage converting apparatus is provided with: a switching control signal generating device configured to generate switching control signals (PWI1, PWI2) for changing on and off the respective first and second switching elements; a current detecting device configured to detect a current value (IL) of a drive current flowing through the first or second switching element, at rise timing of the switching control signal, when the one-arm drive is changed between one-arm drive using the first arm and one-arm driving using the second arm; a current estimating device configured to estimate an average value of the drive current by using the detected current value; and a current controlling device configured to control the drive current on the basis of the estimated average value.

3 Claims, 7 Drawing Sheets (51) Int. Cl.
*B60L 7/14* (2006.01)
*B60L 11/12* (2006.01)
*B60L 11/14* (2006.01)
*B60L 15/20* (2006.01)
*B60L 11/00* (2006.01)
*B60L 15/00* (2006.01)

(52) U.S. Cl.
CPC ............ *B60L 11/14* (2013.01); *B60L 15/007* (2013.01); *B60L 15/2009* (2013.01); *H02M 3/1588* (2013.01); *B60L 2210/10* (2013.01); *B60L 2210/40* (2013.01); *B60L 2220/14* (2013.01); *B60L 2240/421* (2013.01); *B60L 2240/423* (2013.01); *B60L 2240/529* (2013.01); *B60L 2240/80* (2013.01); *B60L 2260/44* (2013.01); *Y02T 10/6217* (2013.01); *Y02T 10/642* (2013.01); *Y02T 10/645* (2013.01); *Y02T 10/7022* (2013.01); *Y02T 10/7077* (2013.01); *Y02T 10/7216* (2013.01); *Y02T 10/7241* (2013.01); *Y02T 10/7275* (2013.01)

(58) Field of Classification Search
USPC ............ 363/95–98, 131–132; 323/131, 132; 318/376, 400.38, 400.39, 400.4
See application file for complete search history.

(56) References Cited

FOREIGN PATENT DOCUMENTS

| | | |
|---|---|---|
| JP | 2011-109884 | 6/2011 |
| JP | 2011-120329 | 6/2011 |
| WO | WO 2010/137127 A1 | 12/2010 |

\* cited by examiner

CONTROL APPARATUS FOR VOLTAGE CONVERTING APPARATUS

CROSS-REFERENCE TO RELATED APPLICATIONS

This application is a national phase application of International Application No. PCT/JP2013/051463, filed Jan. 24, 2013, and claims the priority of Japanese Application No. 2012-012742, filed Jan. 25, 2012, the content of both of which is incorporated herein by reference.

TECHNICAL FIELD

The present invention relates to a control apparatus for a voltage converting apparatus mounted, for example, on a vehicle or the like.

BACKGROUND ART

Recently, as an environmentally-friendly vehicle, attention has been drawn to an electrically-driven vehicle which is equipped with an electrical storage device (such as, for example, a secondary battery and a capacitor) and which drives using a driving force generated from electric power stored in the electrical storage device. The electrically-driven vehicle includes, for example, an electric vehicle, a hybrid vehicle, a fuel-cell vehicle, or the like.

The electrically-driven vehicle is provided, in some cases, with a motor generator which generates the driving force for driving in response to the electric power from the electrical storage device upon departure and acceleration, and which generates electricity due to regenerative braking upon braking and stores electrical energy in the electrical storage device. As described above, the electrically-driven vehicle is equipped with an inverter in order to control the motor generator in accordance with a travelling state.

The vehicle as described above is provided, in some cases, with a voltage converting apparatus (or a converter) between the electrical storage device and the inverter in order to stably supply electric power which is used by the inverter and which varies depending on a vehicle state. The converter sets input voltage of the inverter to be higher than output voltage of the electrical storage device, thereby allowing high output of a motor. The converter also reduces a motor current in the same output, thereby reducing the size and cost of the inverter and the motor.

For further improvement of fuel efficiency of the electrically-driven vehicle, it is important to reduce a loss of the converter and to improve efficiency. Thus, for example, Patent documents 1 to 3 have proposed a technology of switching-driving a boost converter using one arm. According to such a technology, it is considered that the loss of the converter can be reduced by an amount of reduction in current ripple.

PRIOR ART DOCUMENT

Patent Document

Patent Document 1: Japanese Patent Application Laid Open No. 2011-120329
Patent Document 2: Japanese Patent Application Laid Open No, 2006-074932
Patent Document 3: International Publication No. 2010-137127

SUMMARY OF INVENTION

Subject to be Solved by the Invention

In the case of one-arm drive, it is required to change a driving arm according to a change in direction of current from positive (i.e. power running) to negative (i.e. regeneration) through zero. Moreover, it is also required to perform not normal control but non-linear control on a reactor current, near a zero current in which the reactor current is in a discontinuous mode. As a result, at the time of the one-arm drive, it is considered to be important to perform the control with an accurate understanding of timing at which the reactor current is zero.

However, for example, in operation of a general current sensor, an electrical steel (or a core) is magnetized, and an offset is likely generated in an obtained current value. The offset can be corrected, for example, if no current flows; however, the correction is hard if the current flows. It is thus hard to keep detecting an accurate current value all the time by using the current; sensor. Therefore, it is surely far from easy to perform appropriate control at appropriate timing at the time of the one-arm drive.

As described above, in the case of the one-arm drive described in the Patent documents 1 to 3 described above, there is such a technical problem that it is likely impossible to perform the appropriate control in changing the arm because it is hard to accurately detect the current value near the zero current.

In view of the aforementioned problems, it is therefore an object of the present invention to provide a control apparatus for a voltage converting apparatus, configured to accurately detect the current value of the current flowing through the voltage converting apparatus and to perform the appropriate driving control.

Means for Solving the Subject

The above object of the present invention can be achieved by a control apparatus for a voltage converting apparatus configured to realize one-arm drive using only one of a first arm including a first switching element and a second arm including a second switching element by alternatively switching on the first switching element and the second switching element which are connected in series with each other, said control apparatus provide with: a switching control signal generating device configured to generate a switching control signal for changing on and off of the first switching element and a switching control signal for changing on and off of the second switching element; a current detecting device configured to detect a current value of a drive current flowing through the first switching element or the second switching element, at rise timing of the switching control signal, when the one-arm drive is changed between one-arm drive using the first arm and one-arm driving using the second arm; a current estimating device configured to estimate an average value of the drive current by using the detected current value; and a current controlling device configured to control the drive current on the basis of the estimated average value.

The voltage converting apparatus of the present invention is, for example, a converter mounted on a vehicle, and is provided with the first switching element and the second switching element which are connected in series with each other. As the first switching element and the second switching element, for example, an insulated gate bipolar transistor (IGBT), a power metal oxide semiconductor (MOS) transistor, a power bipolar transistor, or the like can be used.

Incidentally, to each of the first switching element and the second switching element, for example, a diode is connected in parallel to form respective one of a first arm and a second arm. In other words, the first switching element forms the first arm, and a switching operation thereof allows on and off of the drive in the first arm to be changed. In the same manner, the second switching element forms the second arm, and a switching operation thereof allows on and off of drive in the second arm to be changed.

Moreover, particularly, the voltage converting apparatus of the present invention can realize the one-arm drive using only one of the first arm including the first switching element and the second arm including the second switching element by alternatively switching on the first switching element and the second switching element.

If the one-arm drive is performed, it is determined which arm of the first arm and the second arm is to be used to perform the one-arm drive, for example, on the basis of a voltage value, a current value, or the like to be outputted. More specifically, for example, the one-arm drive using the first arm is selected if a motor generator connected to the voltage converting apparatus performs a regeneration operation, and the one-arm drive using the second arm is selected if the motor generator performs a power running operation. As described above, at the time of the one-arm drive, the one-arm drive using the first arm and the one-arm drive using the second arm are changed, as occasion demands.

The control apparatus for the voltage converting apparatus of the present invention is an apparatus configured to control the operation of the voltage converting apparatus described above, and can adopt forms of various computer systems, such as various microcomputer apparatuses, various controllers, and various processing units, like a single or plurality of electronic control units (ECUs), which can include, as occasion demands, one or a plurality of central processing units (CPUs), micro processing units (MPUs), various processors, various controllers, or further include various storing devices, such as a read only memory (ROM), a random access memory (RAM), a buffer memory, or a flash memory.

In operation of the control apparatus for the voltage converting apparatus of the present invention, the switching control signal for changing the on and off of the first switching element and the switching control signal for changing the on and off of the second switching element are generated by the switching control signal generating device. Specifically, for example, the switching control signal is generated, for example, by comparing a duty command signal corresponding to a duty ratio of the first switching element and the second switching element with a carrier signal corresponding to switching frequency of the first switching element and the second switching element. The generated switching control signal is supplied to the first switching element and the second switching element, by which the first arm and the second arm of the voltage converting apparatus are controlled.

Particularly in the present invention, the current value of the drive current (i.e. the current flowing through the first switching element or the second switching element) is detected by the current detecting device, when the one-arm drive is changed between one-arm drive using the first arm and one-arm driving using the second arm. The expression "when the one-arm drive is changed between one-arm drive using the first arm and one-arm driving using the second arm" herein does not mean a moment at which the on and off of each of the first switching element and the second switching element is changed, but is a broad concept including a period in which it can be determined that the driving arm is likely changed (e.g. a period in which the current value of the drive current is close to zero which is a threshold value of the arm change).

Moreover, the detection of the current value of the drive current by the current detecting device as described above is performed at the rise timing of the switching control signal for the switching element that is driven, out of the first and second switching elements. Thus, the detected current value of the drive current is an extreme value of the current value (i.e. a maximum value if the current value is positive, and a minimum value if the current value is negative) which periodically fluctuates depending on the one and off of the switching element. The "rise timing" herein does not only mean a moment at which a pulse of the switching control signal rises up, but may also mean timing shifted from the rise of the pulse to some extent as long as the aforementioned extreme value can be detected at the timing.

If the current value of the drive current is detected by the current detecting device, the average value of the drive current is estimated by the current estimating device from the detected current value. The "average value" herein does not mean an average value in a relatively long period but means an instantaneous average value of the current value which periodically fluctuates depending on the on and off of the switching element (i.e. a practical value in a relatively short period of the current value which periodically fluctuates). It is thus preferable that the arm change in the one-arm drive is performed not at a time point at which the current value of the drive current is temporarily zero but at a time point at which the average value of the drive current is zero.

If the average value of the drive current is estimated by the current estimating device, the drive current is controlled by the current controlling device on the basis of the estimated average value. In other words, the current controlling device changes the drive current to a value to be realized, with an understanding of the average value of the drive current. The current controlling device controls the switching control signal generating device, for example, to change a pulse width of the switching control signal, thereby controlling the drive current.

Here, at the time of the one-arm drive, the drive current flows only to one of the first switching element and the second switching element. Thus, if the current value is positive, the negative current does not flow until the arm is changed. On the other hand, if the current value is negative, the positive current does not flow until the arm is changed. Thus, an upper limit of the current value in this case is zero.

If the current value changes under the aforementioned restriction, the periodical fluctuation of the current value is temporarily disordered in the state in which the average value of the drive current is close to zero. Thus, the control of the drive current is non-linear and relatively complicated in the state in which the average value of the drive current is close to zero.

In the present invention, however, particularly as described above, the extreme value of the current value which periodically fluctuates is detected on the current detecting device. Therefore, for example, if the detected current value does not change, it can be preferably determined that the average value of the drive current is close to zero, and the drive current can be appropriately controlled according to circumstances.

As explained above, according to the control apparatus for the voltage converting apparatus of the present invention, it is possible to accurately detect the current value of the current flowing through the voltage converting apparatus, and to perform the appropriate drive control.

In one aspect of the control apparatus for the voltage converting apparatus of the present invention, wherein the current estimating device estimates that the average value of the drive current is a near-zero value which is close to zero if the detected current value is continuously within a predetermined range, and the current controlling device controls the switching control signal generating device to perform near-zero control corresponding to the near-zero value.

According to this aspect, it is estimated by the current estimating device that the average value of the drive current is the near-zero value which is close to zero if the current value detected by the current detecting device is continuously within the predetermined range. The "predetermined range" herein is a threshold value for determining that the continuously detected current value is equal or is extremely close enough to say that it is equal, and is set in advance on the basis of detection accuracy of the current value or the like. Moreover, the "near-zero value" is a value corresponding to the average value of the drive current and indicating that the waveform of the drive current is in a limited state by reaching zero. The "near-zero value" can be estimated by that the detected current value is continuously within the predetermined range (i.e. the detected current value reaches zero which is a limiting value).

If it is estimated that the average value of the drive current is the near-zero value, the switching control signal generating device is controlled by the current controlling device to perform the near-zero control corresponding to the near-zero value. The "near-zero control" herein is drive control which is required by the drive current approaching zero and which is different from the normal control. For example, the "near-zero control" includes non-linear control in which the pulse width of the switching control signal is gradually reduced.

According to this aspect, it is possible to estimate that the average value of the drive current is the near-zero value, extremely easily and accurately, by the condition that the current value detected by the current detecting device is continuously within the predetermined range. It is therefore possible to control the voltage converting apparatus, more preferably.

In an aspect in which it is estimated that the average value of the drive current is the near-zero value, as described above, the control apparatus for the voltage converting apparatus may provide with a zero current estimating device configured to estimate that the current value is zero if the detected current value is continuously within the predetermined range; and a zero timing estimating device configured to estimate timing at which the average value of the drive current is zero, on the basis of the current value estimated as zero and a change in the average value of the drive current, wherein the current controlling device may control the switching control signal generating device such that the average value of the drive current becomes zero at the zero timing.

According to this aspect, it is estimated by the zero current estimating device that the current value that is continuously within the predetermined range is zero as an upper limit value or a lower limit value if the detected current value is continuously within the predetermined range. If there is a difference between two current values which are continuously within the predetermined range, one of the two current values may be estimated as zero. Alternatively, the average value of the two current values may be estimated as zero.

If the zero current value is estimated, the zero timing at which the average value of the drive current is zero is estimated by the zero timing estimating device. The zero timing estimating device estimates the zero timing on the basis of the current value estimated as zero and the change in the average value of the drive current. More specifically, the zero timing estimating device estimates, as the zero timing, for example, a point at which an extended line of the change in the average value of the drive current and the current value estimated as zero cross.

If the zero timing is estimated, the switching control signal generating device is controlled by the current controlling device such that the average value of the drive current becomes zero at the zero timing. In other words, the estimated zero timing is used in a feed-forward manner for the control of the drive current by the current controlling device. This makes it possible to certainly set the drive current to be zero at the zero timing. It is therefore possible to preferably perform the control if the drive current is the near-zero value.

In an aspect in which the zero timing is estimated, as described above, wherein the current controlling device may control the switching control signal generating device to change the one-arm drive between one-arm drive using the first arm and one-arm driving using the second arm at the zero timing.

In this case, since the zero timing at which the average value of the drive current is zero is accurately estimated by the zero timing estimating device, the arm change control by the current controlling device can be preferably performed. It is therefore possible to effectively prevent the problem caused by a shift of arm change timing from the zero timing.

The operation and other advantages of the present invention will become more apparent from the embodiment explained below.

MODES FOR CARRYING OUT THE INVENTION

Hereinafter, an embodiment of the present invention will be explained with reference to the drawings.

Figure 1:
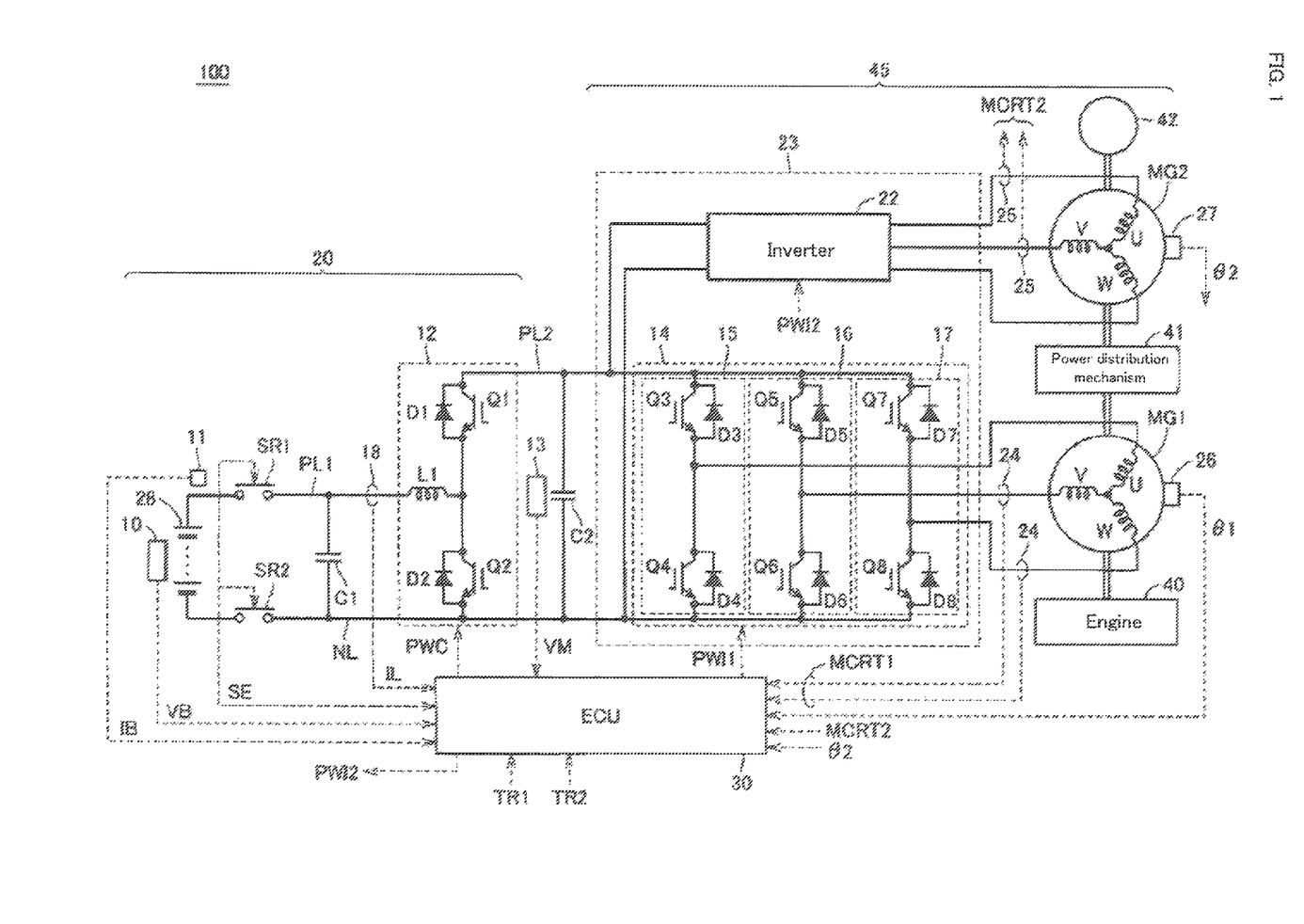
FIG. 1 is a schematic diagram illustrating an entire configuration of a vehicle equipped with a control apparatus for a voltage converting apparatus in an embodiment.

Firstly, an entire configuration of a vehicle equipped with a control apparatus for a voltage converting apparatus in the embodiment will be explained with reference to FIG. 1. FIG. 1 is a schematic diagram illustrating the entire configuration of the vehicle equipped with the control apparatus for the voltage converting apparatus in the embodiment.

In FIG. 1, a vehicle 100 equipped with the control apparatus for the voltage converting apparatus in the embodiment is configured as a hybrid vehicle using an engine 40 and motor generators MG1 and MG2 as a power source. The configuration of the vehicle 100, however, is not limited to this example, and can be also applied to a vehicle which can drive due to electric power from an electrical storage device (e.g. an electric vehicle and a fuel-cell vehicle) or the like. Moreover, in the embodiment, an explanation will be given to the configuration that the control apparatus for the voltage converting apparatus is mounted on the vehicle 100; however, the control apparatus for the voltage converting apparatus can be applied to any apparatus that is driven by an alternating current (AC) electric motor, other than the vehicle.

The vehicle 100 is provided with a direct current (DC) voltage generation unit 20, a load device 45, a smoothing condenser C2, and an ECU 30.

The DC voltage generation unit 20 includes an electrical storage device 28, system relays SR1 and SR2, a smoothing condenser C1, and a converter 12.

The electrical storage device 28 includes an electrical storage device such as, for example, a secondary battery like nickel metal hydride or lithium ion, and an electrical double layer capacitor. Moreover, a DC voltage VB outputted by the electrical storage device 28 and a DC current IB inputted or outputted by the electrical storage device 28 are detected by a voltage sensor 10 and a current sensor 11, respectively. The voltage sensor 10 and the current sensor 11 output a detected value of the DC voltage VB and a detected value of the DC current IB to the ECU 30, respectively.

The system relay SR1 is connected between a positive terminal of the electrical storage device 28 and a power line PL1. The system relay SR2 is connected between a negative terminal of the electrical storage device 28 and a grounding line NL. The system relays SR1 and SR2 are controlled by a signal SE from the ECU 30 to change supply and cutoff of the electric power to the converter 12 from the electrical storage device 28.

The converter 12 is one example of the "voltage converting apparatus" of the present invention. The converter 12 includes a reactor L1, switching elements Q1 and Q2, and diodes D1 and D2. The switching elements Q1 and Q2 are one example of the "first switching element" and the "second switching element" of the present invention, respectively, and are connected in series between a power line PL2 and the grounding line NL. The switching elements Q1 and Q2 are controlled by a switching control signal PWC from the ECU 30.

For the switching elements Q1 and Q2, for example, an IGBT, a power MOS transistor, a power bipolar transistor, or the like can be used. For the switching elements Q1 and Q2, reverse parallel diodes D1 and D2 are provided, respectively. The reactor L1 is disposed between a connection node of the switching elements Q1 and Q2 and the power line PL1. Moreover, the smoothing condenser C2 is connected between the power line PL2 and the grounding line NL.

The current sensor 18 is one example of the "current detecting device" of the present invention. The current sensor 18 detects a reactor current flowing through the reactor L1 and outputs a detected value IL of the reactor current to the ECU 30.

The load device 45 includes an inverter 23, the motor generators MG1 and MG2, the engine 40, a power distribution mechanism 41, and a driving wheel 42. The inverter 23 includes an inverter 14 for driving the motor generator MG1 and an inverter 22 for driving the motor generator MG2. Incidentally, it is not essential to provide two sets of the inverter and the motor generator as illustrated in FIG. 1. For example, either a set of the inverter 14 and the motor generator MG1 or a set of the inverter 22 and the motor generator MG2 may be only provided.

The motor generators MG1 and MG2 generate a rotational driving force for propelling the vehicle in response to AC power supplied from the inverter 23. The motor generators MG1 and MG2 receive a rotational force from the exterior, generate AC power due to a regenerative torque command from the ECU 30, and generate a regenerative braking force in the vehicle 100.

The motor generators MG1 and MG2 are also connected to the engine 40 via the power distribution mechanism 41. A driving force generated by the engine 40 and the driving force generated by the motor generators MG1 and MG2 are controlled to have an optimal ratio. Moreover, one of the motor generators MG1 and MG2 may be set to function only as an electric motor, and the other motor generator may be set to function only as a generator. Incidentally, in the embodiment, the motor generator MG1 is set to function as a generator driven by the engine 40, and the motor generator MG2 is set to function as an electric motor driven by the driving wheel 42.

The power distribution mechanism 41 uses, for example, a planetary gear mechanism (or planetary gear) to distribute the power of the engine 40 to the driving wheel 42 and the motor generator MG1.

The inverter 14 drives the motor generator MG1, for example, to start the engine 40 in response to an increased voltage from the converter 12. The inverter 14 also outputs, to the converter 12, regenerative electric power generated by the motor generator MG1 due to the mechanical power transmitted from the engine 40. At this time, the converter 12 is controlled by the ECU 30 to operate as a voltage lowering circuit or a voltage down converter.

The inverter 14 is provided in parallel between the power line PL2 and the grounding line NL, and includes a U-phase upper-lower arm 15, a V-phase upper-lower arm 16, and a W-phase upper-lower arm 17. Each phase upper-lower arm is provided with switching elements which are connected in series between the power line PL2 and the grounding line NL. For example, the U-phase upper-lower arm 15 is provided with switching elements Q3 and Q4. The V-phase upper-lower arm 16 is provided with switching elements Q5 and Q6. The W-phase upper-lower arm 17 is provided with switching elements Q7 and Q8. Moreover, to the switching elements Q3 to Q8, reverse parallel diodes D3 to D8 are connected, respectively. The switching elements Q3 to Q8 are controlled by a switching control signal PWI from the ECU 30.

For example, the motor generator MG1 is a three-phase permanent magnet synchronous motor, and one ends of three coils in the U, V, and W phases are commonly connected to a neutral point of the motor generator MG1. Moreover, the other ends of the respective phase coils are connected to connection nodes of the respective phase upper-lower arms 15 to 17.

The inverter 22 is connected in parallel with the inverter 14 with respect to the converter 12.

The inverter 22 converts a DC voltage outputted by the converter 12 to a three-phase AC voltage and outputs it to the motor generator MG2 configured to drive the driving wheel 42. Moreover, the inverter 22 output regenerative electric power generated by the motor generator MG2 to the converter 12, in association with regenerative braking. At this time, the converter 12 is controlled by the ECU 30 to function as a voltage lowering circuit or a voltage down converter. An internal configuration of the inverter 22 is not illustrated, but is the same as that of the inverter 14, and a detailed explanation thereof will be omitted.

The converter 12 is controlled basically such that the switching elements Q1 and Q2 are switched on and off, complementarily and alternately, within each switching period. The converter 12 increases the DC voltage VB supplied from the electrical storage device 28, to a DC voltage VM (wherein this DC voltage corresponding to an input voltage to the inverter 14 will be also hereinafter referred to as a "system voltage") in a boosting or voltage increasing operation. The voltage increasing operation is performed by supplying electromagnetic energy stored in the reactor L1 during an ON period of the switching element Q2, to the power line PL2 via the switching element Q1 and the reverse parallel diode D1.

Moreover, the converter 12 lowers the DC voltage VM to the DC voltage VB in a voltage lowering operation. The voltage lowering operation is performed by supplying electromagnetic energy stored in the reactor L1 during an ON period of the switching element Q1, to the grounding line NL via the switching element Q2 and the reverse parallel diode D2.

A voltage conversion ratio (or a ratio of VM and VB) in the voltage increasing operation and the voltage lowering operation is controlled by an ON period ratio (or a duty ratio) of the switching elements Q1 and Q2 in the switching period. Incidentally, if the switching element Q1 is fixed to be ON and the switching element Q2 is fixed to be OFF, it is also possible to set VM=VB (voltage conversion ratio=1.0).

The smoothing condenser C2 smoothes the DC voltage from the converter 12, and supplies the smoothed DC voltage to the inverter 23. A voltage sensor 13 detects a voltage between both ends of the smoothing condenser C2, i.e. the system voltage VM, and outputs a detected value of the system voltage VM to the ECU 30.

In cases where a torque command of the motor generator MG1 is positive (TR1>0), when the DC voltage is supplied from the smoothing condenser C2, the inverter 14 drives the motor generator MG1 to convert the DC voltage to an AC voltage and to output positive torque by a switching operation of the switching elements Q3 to Q8 responding to a switching control signal PWI1 from the ECU 30. In cases where the torque command of the motor generator MG1 is zero (TR1=0), the inverter 14 drives the motor generator MG1 to convert the DC voltage to the AC voltage and to provide zero torque by the switching operation responding to the switching control signal PWI1. By this, the motor generator MG1 is driven to generate the zero or positive torque specified by the torque command TR1.

Moreover, upon regenerative braking of the vehicle 100, the torque command TR1 of the motor generator MG1 is set to be negative (TR1<0). In this case, the inverter 14 converts the AC voltage generated by the motor generator MG1 to a DC voltage by the switching operation responding to the switching control signal PWI1, and supplies the converted DC voltage (or the system voltage) to the converter 12 via the smoothing condenser C2. Incidentally, the regenerative braking herein includes braking associated with power regeneration when a foot brake operation is performed by a driver who drives an electrically-driven vehicle, and deceleration (or stopping acceleration) of a vehicle during the power regeneration by stepping off an accelerator pedal in travelling even though a foot brake is not operated.

In the same manner, the inverter 22 drives the motor generator MG2 to convert the DC voltage to the AC voltage and to provide predetermined torque by the switching operation responding to a switching control signal PWI2 from the ECU 30 corresponding to a torque command of the motor generator MG2.

Current sensors 24 and 25 detect motor currents MCRT1 and MCRT2 flowing through the motor generators MG1 and MG2, respectively, and output the detected motor currents to the ECU 30. Incidentally, the sum of instantaneous values of the current in the U-phase, the V-phase, and the W-phase is zero, and it is thus sufficient to arrange the current sensors 24 and 25 to detect the motor currents in the two phases, as illustrated in FIG. 1.

Rotational angle sensors (or resolvers) 26 and 27 detect a rotational angle $\theta 1$ of the motor generator MG1 and a rotational angle $\theta 2$ of the motor generator MG2, respectively, and transmit the detected rotational angles $\theta 1$ and $\theta 2$ to the ECU 30. The ECU 30 can calculate rotational speeds MRN1 and MRN2 and angular velocities $\omega 1$ and $\omega 2$ (rad/s) of the motor generators MG1 and MG2 on the basis of the rotational angles $\theta 1$ and $\theta 2$, respectively. Incidentally, the rotational angle sensors 26 and 27 may not be provided by directly operating or calculating the rotational angles $\theta 1$ and $\theta 2$ from a motor voltage and an electric current on the ECU 30.

The ECU 30 includes, for example, a central processing unit (CPU), a storage device, and an input/output buffer, none of which is illustrated, and controls each device of the vehicle 100. The ECU 30 is one example of the "control apparatus for the voltage converting apparatus" of the present invention, and specifically has functions as the "switching control signal generating device", the "current estimating device", the "current controlling device", the "zero current estimating device", and the "zero timing estimating device". Incidentally, control performed by the ECU 30 is not limited to processing using software. The control can be established and processed on dedicated hardware (or electronic circuit).

As a representative function, the ECU 30 controls the operation of the converter 12 and the inverter 23 such that the motor generators MG1 and MG2 output torque according to the torque commands TR1 and TR2, on the basis of the inputted torque commands TR1 and TR2, the DC voltage VB detected by the voltage sensor 10, the DC current IB detected by the current sensor 11, the system voltage VM detected by the voltage sensor 13, the motor currents MCRT1 and MCRT2 from the current sensors 24 and 25, the rotational angles $\theta 1$ and $\theta 2$ from the rotational angle sensors 26 and 27, and the like. In other words, the ECU 30 generates the switching control signals PWC, PWI1, and PWI2 to control the converter 12 and the inverter 23 as described above, and outputs each of the switching control signals to respective one of the converter 12 and the inverter 23.

In the voltage increasing operation of the converter 12, the ECU 30 feedback-controls the system voltage VM and generates the switching control signal PWC to match the system voltage VM with a voltage command.

Moreover, when the vehicle 100 becomes into a regenerative braking mode, the ECU 30 generates the switching control, signals PWI1 and PWI2 to convert the AC voltage generated by the motor generators MG1 and MG2 to the DC voltage, and outputs the switching control signals to the inverter 23. By this, the inverter 23 converts the AC voltage generated by the motor generators MG1 and MG2 to the DC voltage and supplies it to the converter 12.

Moreover, when the vehicle 100 becomes into the regenerative braking mode, the ECU 30 generates the switching control signal PWC to lower the DC voltage supplied from the inverter 23 and outputs it to the converter 12. By this, the AC voltage generated by the motor generators MG1 and MG2 is converted to the DC voltage, is lowered, and is supplied to the electrical storage device 28.

Figure 2:
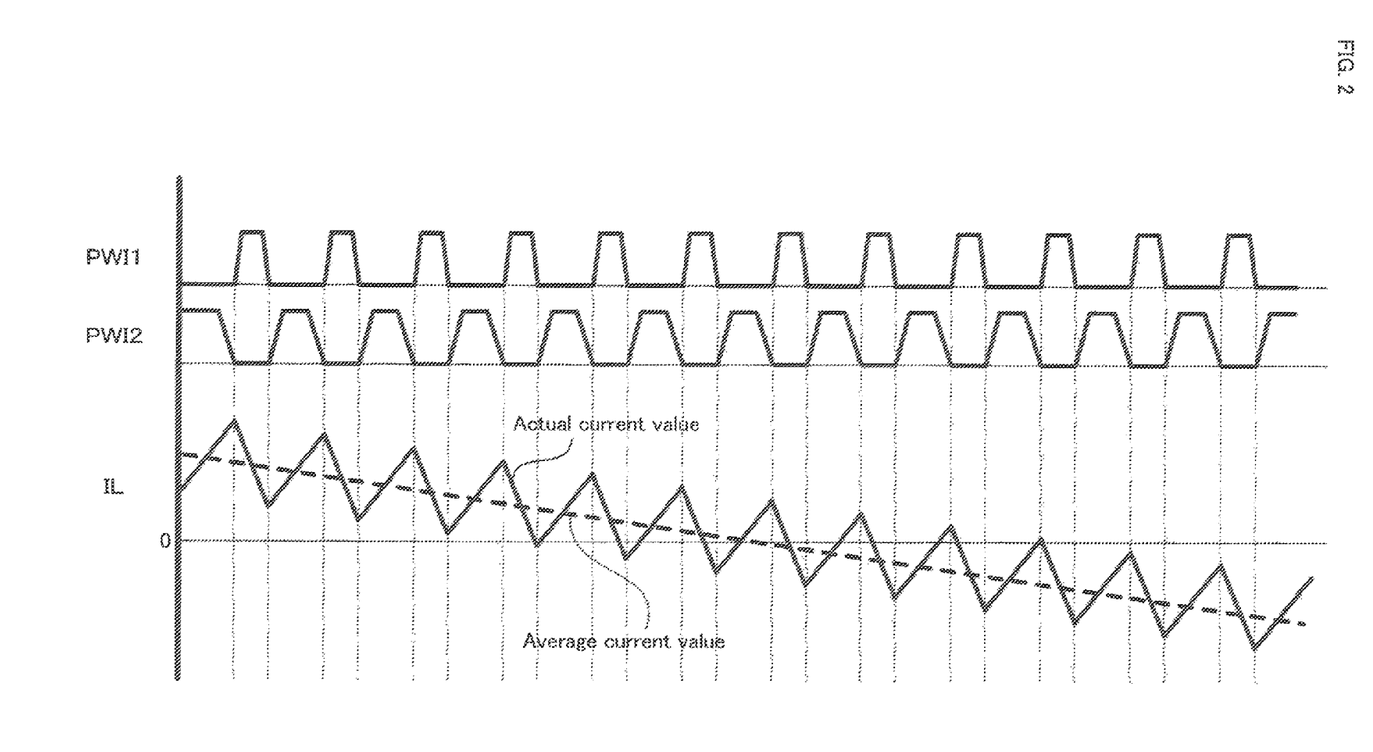
FIG. 2 is a chart illustrating fluctuation of a current value at the time of two-arm drive.
Figure 3:
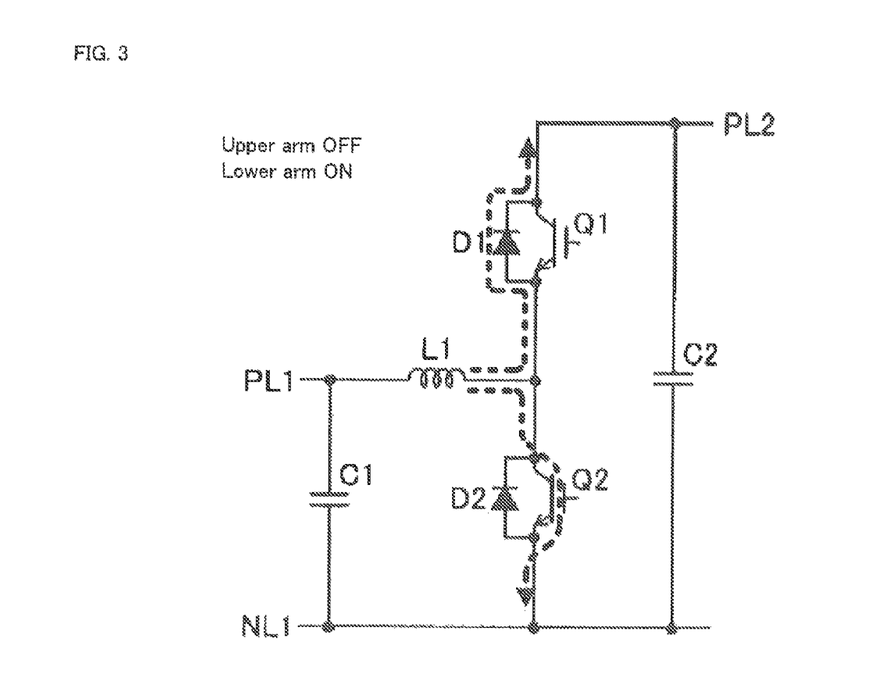
FIG. 3 is a conceptual diagram illustrating a current flow at the time of lower-arm drive.
Figure 4:
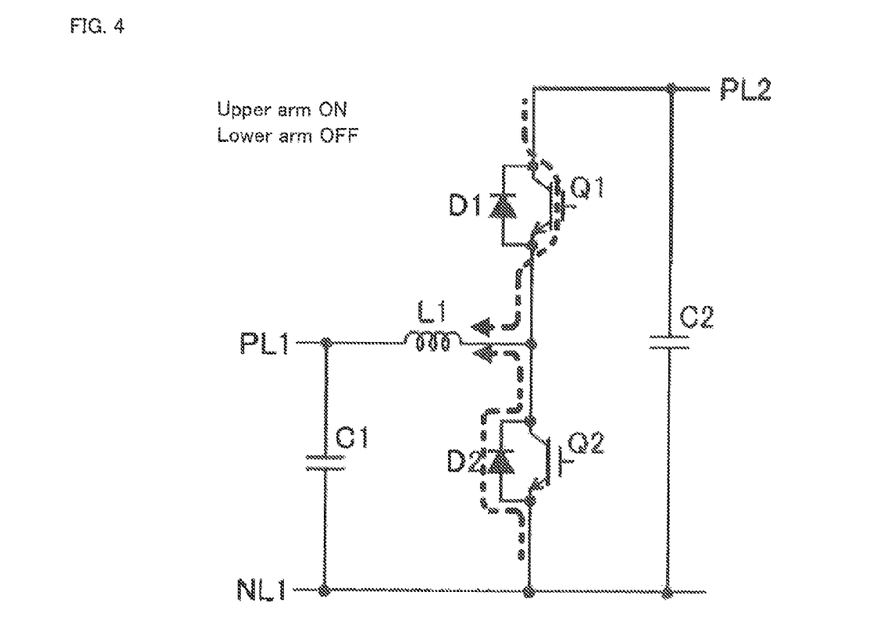
FIG. 4 is a conceptual diagram illustrating a current flow at the time of upper-arm drive.
Figure 5:
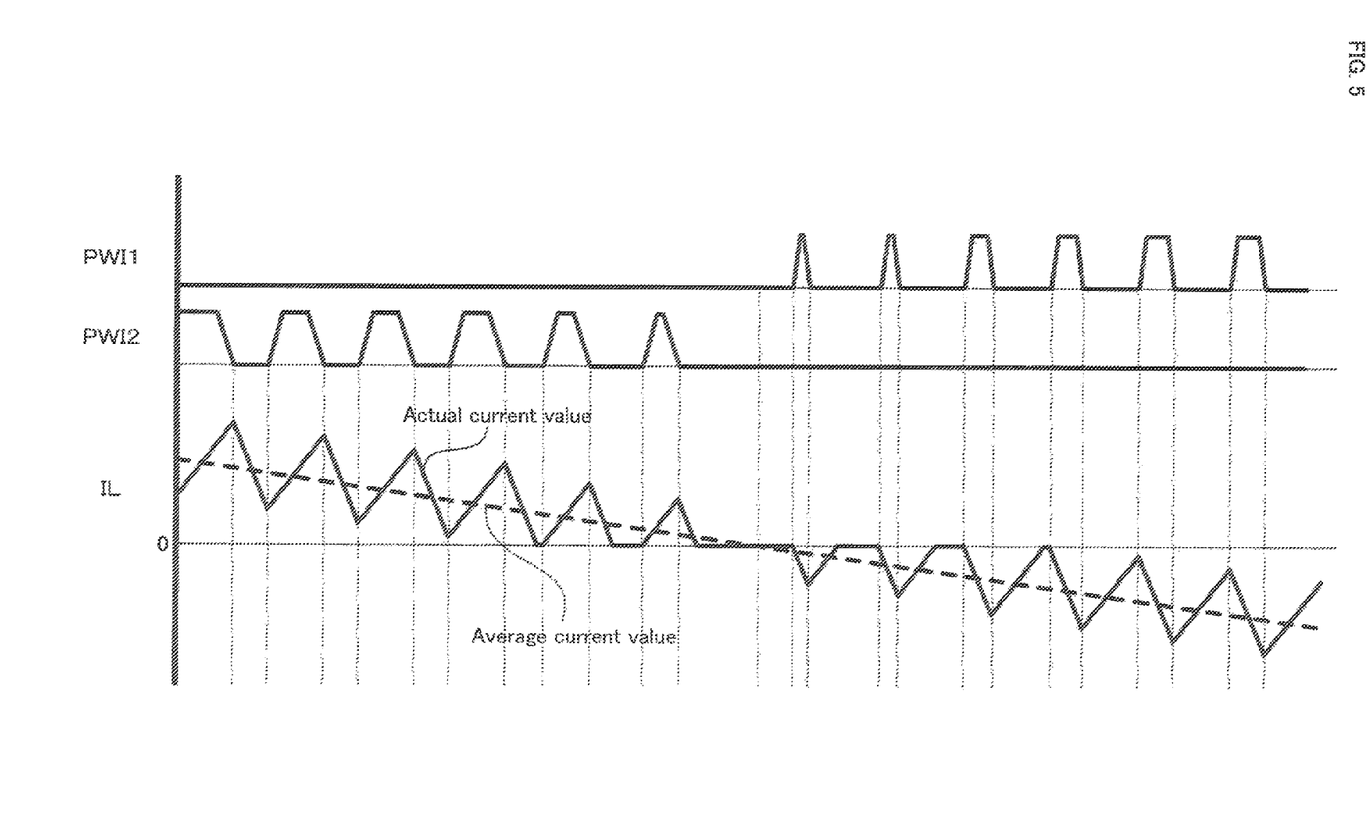
FIG. 5 is a chart illustrating fluctuation of a current value at the time of one-arm drive.

Now, current fluctuation in the operation of the converter 12 will be explained with reference to FIG. 2 to FIG. 5. FIG. 2 is a chart illustrating fluctuation of a current value at the time of two-arm drive. FIG. 3 is a conceptual diagram illustrating a current flow at the time of lower-arm drive. FIG. 4 is a conceptual diagram illustrating a current flow at the time of upper-arm drive. FIG. 5 is a chart illustrating fluctuation of a current value at the time of one-arm drive.

In FIG. 2, if the converter 12 performs two-arm drive (i.e. drive for switching on both the switching elements Q1 and Q2), the switching control signal PWI1 for changing the on and off of the switching element Q1 and the switching control signal PWI2 for changing the on and off of the switching element Q2 are supplied to the switching elements Q1 and Q2, respectively, by which the value of the reactor current IL is controlled.

Incidentally, at the time of the two-arm drive, a positive current and a negative current can be applied by each of the switching elements Q1 and Q2. Thus, for example, even in current control in which the reactor current crosses zero as illustrated, the same control as normal can be performed.

In FIG. 3 and FIG. 4, the converter 12 in the embodiment can realize one-arm drive for switching on only one of the switching elements Q1 and Q2, in addition to the two-arm drive described above. Specifically, upon power running, lower-arm drive for switching on only the switching element Q2 is performed. In this case, as illustrated in FIG. 3, an electric current flowing on the switching element Q1 side flows via the diode D1, and an electric current flowing on the switching element Q2 flows via the switching element Q2. On the other hand, upon regeneration, upper-arm drive for switching on only the switching element Q1 is performed. In this case, as illustrated in FIG. 4, an electric current flowing on the switching element Q1 side flows via the switching element. Q1, and an electric current flowing on the switching element Q2 flows via the diode D2.

According to the one-arm drive, only one of the switching elements Q1 and Q2 is switched on, and thus, a dead time set to prevent a short circuit of the switching elements Q1 and Q2 is not required. Thus, for example, even if high frequency is required in association with a miniaturized apparatus, it is possible to prevent a reduction in boosting performance of the converter 12.

In FIG. 5, upon power running in which the lower-arm drive is performed (i.e. in cases where the reactor current IL is positive), the switching control signal PWI1 for changing the on and off of the switching elements Q1 is not supplied, and only the switching control signal PWI2 for changing the on and off of the switching elements Q2 is supplied. Moreover, upon regeneration in which the upper-arm drive is performed (i.e. in cases where the reactor current IL is negative), only the switching control signal PWI1 for changing the on and off of the switching elements Q1 is supplied, and the switching control signal PWI2 for changing the on and off of the switching elements Q2 is not supplied.

Here, in particular, since the negative current cannot be applied at the time of the lower-arm drive, if a lower limit of the reactor current IL falls to zero, it is required to change a duty ratio of the switching control signal PWI2 to perform non-linear control. In the same manner, since the positive current cannot be applied at the time of the upper-arm drive, if an upper limit of the reactor current IL falls to zero, it is required to change a duty ratio of the switching control signal PWI1 to perform the non-linear control. In other words, at the time of the one-arm drive, if the reactor current IL approaches zero, relatively complicated control which is different from the normal control is required.

The control apparatus for the voltage converting apparatus in the embodiment aims at accurately determining that the reactor current IL approaches zero, in order to preferably perform the unique characteristic at the time of the one-arm drive described above.

Figure 6:
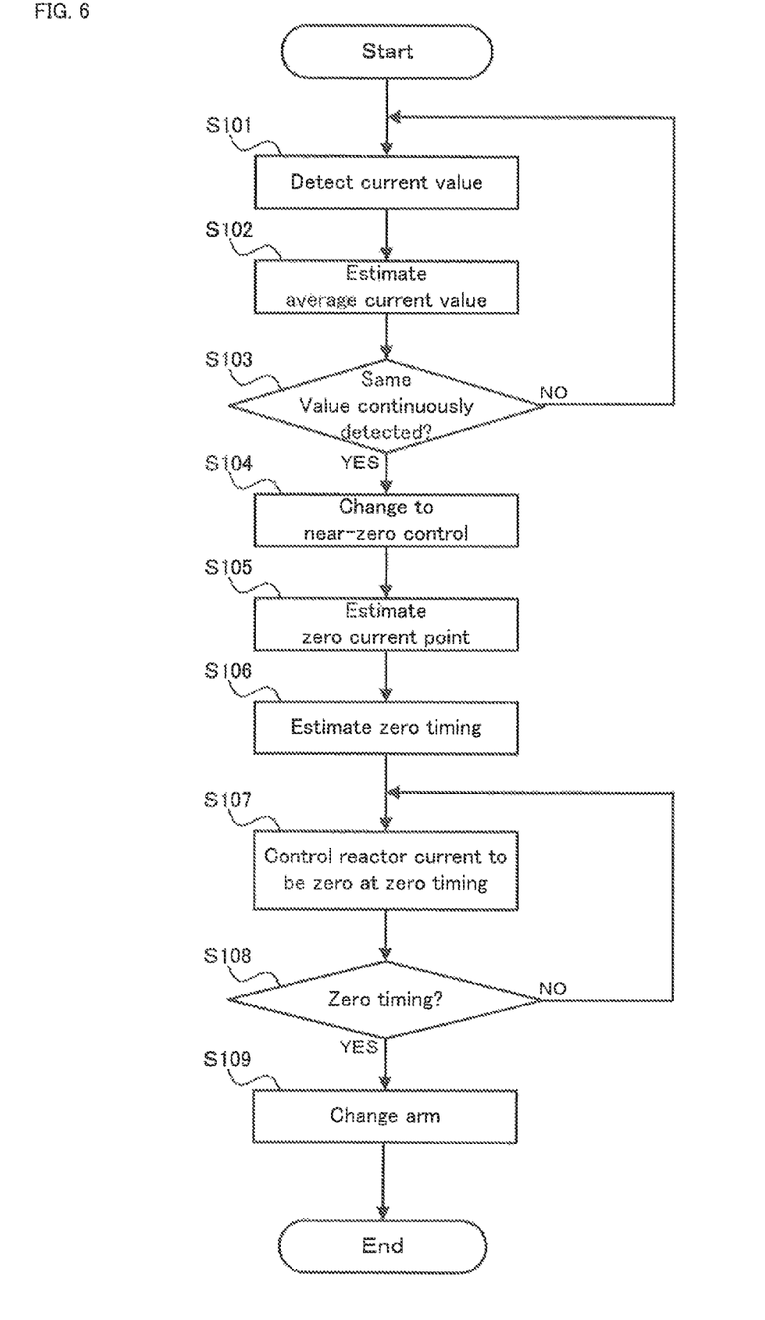
FIG. 6 is a flowchart illustrating operation of the control apparatus for the voltage converting apparatus in the embodiment.

Next, the operation of the control apparatus for the voltage converting apparatus in the embodiment will be explained with reference to FIG. 6 to FIG. 10. FIG. 6 is a flowchart illustrating the operation of the control apparatus for the voltage converting apparatus in the embodiment. Each of FIG. 7 to FIG. 10 is a chart illustrating, in due course, a method of controlling the voltage converting apparatus. Hereinafter, the operation in a case where the lower-arm drive is changed to the upper-arm drive will be explained.

Figure 7:
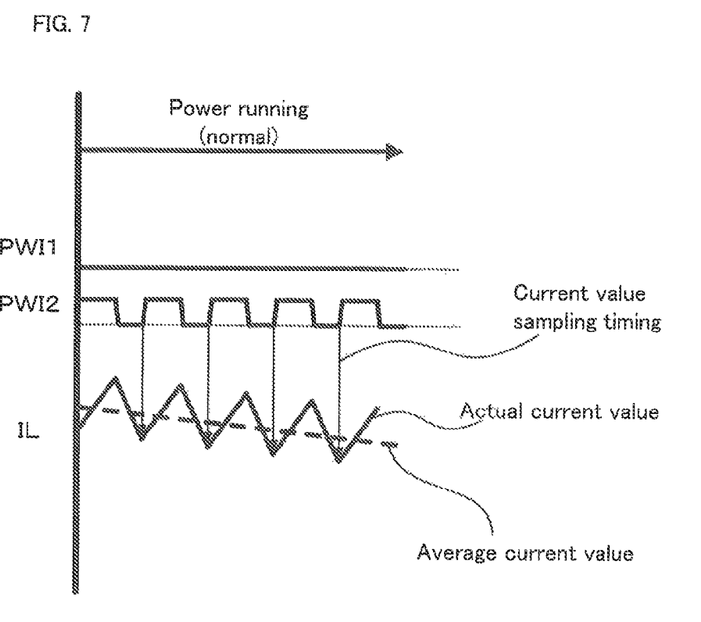
FIG. 7 is a chart (ver. 1) illustrating, in due course, a method of controlling the voltage converting apparatus in the embodiment.

In FIG. 6 and FIG. 7, in operation of the control apparatus for the voltage converting apparatus in the embodiment, firstly, the reactor current IL is detected by the current sensor 18 at rise timing of the switching control signal PWI (step S101). Thus, if the vehicle 100 is in a power running state and the lower-arm drive is performed, the reactor current IL is detected at the rise timing of the switching control signal PWI2 corresponding to the switching element Q2. If the reactor current IL is detected at the timing as described above, as is clear from FIG. 7, it is possible to detect a minimum value of the reactor current IL which fluctuates depending on the on and off of the switching element Q2.

If the reactor current IL is detected., an average value of the reactor current IL is estimated on the ECU 30 (step S102). For example, the detected value of the reactor current IL can be used to estimate the average value. Alternatively, the reactor current IL detected at timing other than the rise timing of the switching control signal PWI2 (e.g. rise timing of the switching control signal PWI1, timing of peaks and valleys of a carrier signal) can be used to estimate the average value.

Figure 8:
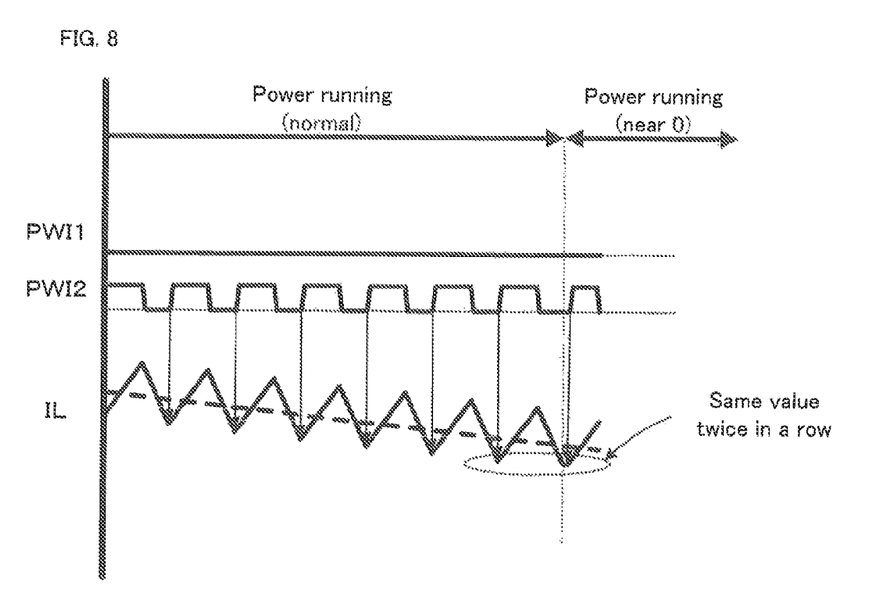
FIG. 8 is a chart (ver. 2) illustrating, in due course, the method of controlling the voltage converting apparatus in the embodiment.

In FIG. 6 and FIG. 8, the ECU 30 determines whether or not the reactor current IL detected by the current sensor 18 is continuously within a predetermined range (in other words, in a state in which it is close enough to say the same value) (step S103). If the reactor current IL which is normally supposed to keep decreasing is within the predetermined range (the step S103: YES), it can be considered that the lower limit of the reactor current IL reaches zero and the reactor current IL is in a limited state.

In this case, the ECU 30 determines that the average value of the reactor current is a near-zero value, and the control of the converter 12 is changed from the normal control to the near-zero control corresponding to the near-zero value (step S104). Specifically, linear control in which the duty ratio of the switching control signal PWI2 does not change is changed to the non-linear control in which the duty ratio of the switching control signal PWI2 changes, as illustrated in FIG. 5.

Figure 9:
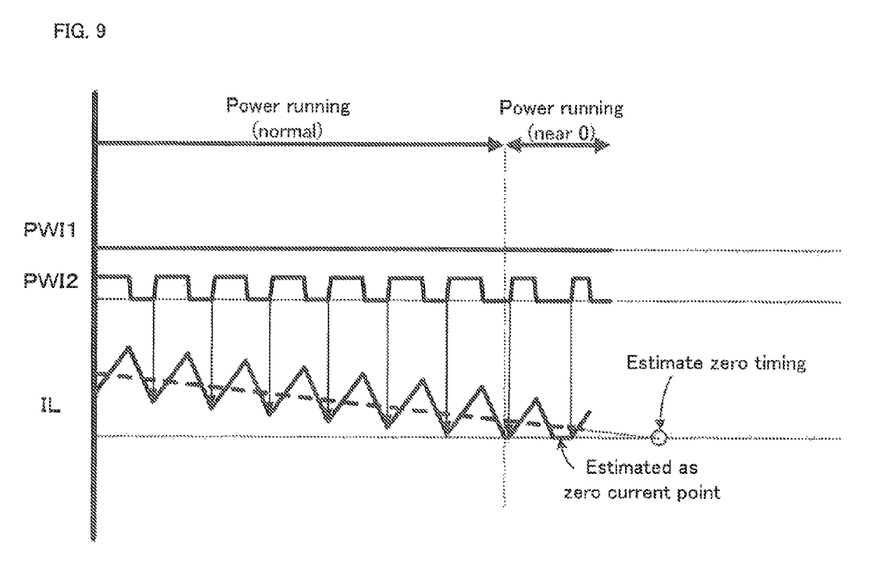
FIG. 9 is a chart (ver. 3) illustrating, in due course, the method of controlling the voltage converting apparatus in the embodiment.

In FIG. 6 and FIG. 9, if the near-zero control is started, the ECU 30 estimates that the current value that is continuously within the predetermined range is a zero current point (step S105). Moreover, timing at which an extended line of a change in the average value of the reactor current IL and the zero current point cross is estimated as zero timing at which the average value of the reactor current IL becomes zero (step S106).

If the zero timing is estimated, the near-zero control is performed by the ECU 30 such that the average value of the reactor current IL becomes zero at the zero timing. Specifically, the duty ratio of the switching control signal PWI2 is controlled in a non-linear manner on the basis of the zero timing. As described above, the estimated zero timing is used in a feed-forward manner for the control of the reactor current IL.

Figure 10:
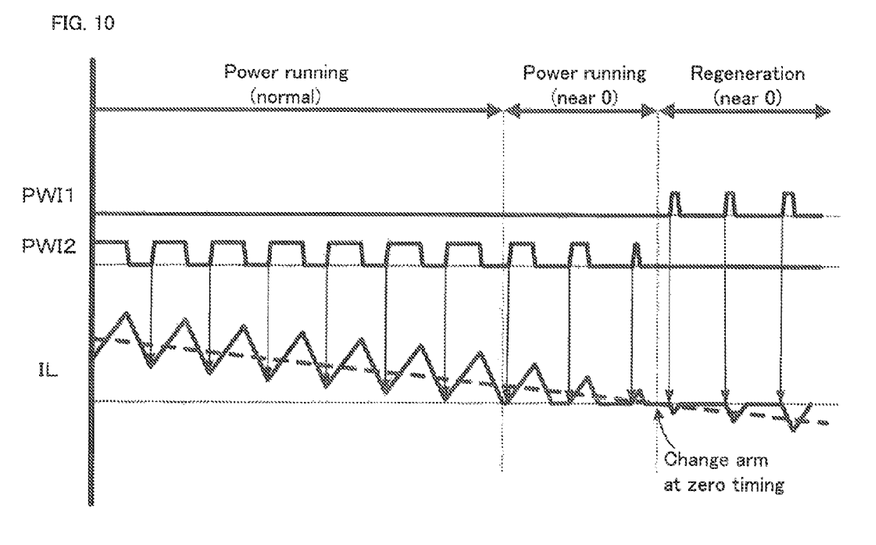
FIG. 10 is a chart (ver. 4) illustrating, in due course, the method of controlling the voltage converting apparatus in the embodiment.

In FIG. 6 and FIG. 10, if the average value of the reactor current IL is gradually reduced by the near-zero control and it becomes the zero timing (step S108: YES), arm change control is performed by the ECU 30 (step S109). In other words, the lower-arm drive is changed to the upper-arm drive. Specifically, the ECU 30 changes the arm by outputting the switching control signal PWI1 corresponding to the switching element Q1, instead of the switching control signal PWI2 corresponding to the switching element Q2.

Here, particularly in the embodiment, the timing at which the average value of the reactor current IL is zero is accurately estimated by the estimation of the zero timing described above. It is thus possible to change the arm at extremely appropriately timing (i.e. at timing at which the average value of the reactor current IL is extremely close to zero). This makes it possible to effectively prevent the problem caused by a shift in arm change timing.

A detailed explanation is omitted, but after the arm change, near-zero control upon regeneration is performed instead of the near-zero control upon power running. This makes it possible to appropriately control the drive current even in the upper-arm drive in which the positive current cannot be used.

Upon regeneration, the detection of the reactor current IL is performed at rise timing of the switching control signal PWI1. By this, as in the aforementioned power running, it is possible to determine whether or not the reactor current reaches zero and is in the limited state. If the average value of the reactor current IL is reduced and does not fall to zero (e.g. if the detected reactor current IL is not continuously within the predetermined range), the control of the converter 12 is changed from the non-linear, near-zero control to the linear, normal control.

As explained above, according to the control apparatus for the voltage converting apparatus in the embodiment, it is possible to accurately detect the current value of the current flowing through the converter 12 and to perform the appropriate drive control. In the embodiment described above, the case where the lower-anal drive is changed to the upper-arm drive (i.e. the case where the power running is changed to the regeneration) is exemplified and explained; however, the same control can be also applied even in a case where the upper-arm drive is changed to the lower-arm drive (i.e. a case where the regeneration is changed to the power running).

The present invention is not limited to the aforementioned embodiment, but various changes may be made, if desired, without departing from the essence or spirit of the invention which can be read from the claims and the entire specification. A control apparatus for a voltage converting apparatus, which involves such changes, is also intended to be within the technical scope of the present invention.

DESCRIPTION OF REFERENCE NUMERALS 21 converter
18 current sensor
20 direct current voltage generation unit
22, 23 inverter
28 electrical storage device
30 ECU
40 engine
41 power distribution mechanism
42 driving wheel
45 load device
100 vehicle
C2 smoothing condenser
D1, D2 diode
IL reactor current
L1 reactor
MG1, MG2 motor generator
PWI1, PWI2 switching control signal
Q1, Q2 switching element
SR1, SR2 system relay

The invention claimed is:

1. A control apparatus for a voltage converting apparatus configured to realize one-arm drive using only one of a first arm including a first switching element and a second arm including a second switching element by alternatively switching on the first switching element and the second switching element which are connected in series with each other, said control apparatus comprising:

a switching control signal generating device configured to generate a switching control signal for changing on and off of the first switching element and a switching control signal for changing on and off of the second switching element;

a current detecting device configured to detect a current value of a drive current flowing through the first switching element or the second switching element, at rise timing of the switching control signal, when the one-arm drive is changed between one-arm drive using the first arm and one-arm driving using the second arm;

a current estimating device configured to estimate an average value of the drive current by using the detected current value; and a current controlling device configured to control the drive current on the basis of the estimated average value, wherein the current estimating device estimates that the average value of the drive current is a near-zero value which is close to zero if the detected current value is continuously within a predetermined range, and the current controlling device controls the switching control signal generating device to perform near-zero control corresponding to the near-zero value.

2. The control apparatus for the voltage converting apparatus according to claim 1, comprising:
- a zero current estimating device configured to estimate that the current value is zero if the detected current value is continuously within the predetermined range; and
- a zero timing estimating device configured to estimate zero timing at which the average value of the drive current becomes zero, on the basis of the current value estimated as zero and a change in the average value of the drive current, wherein the current controlling device controls the switching control signal generating device such that the average value of the drive current becomes zero at the zero timing.

3. The control apparatus for the voltage converting apparatus according to claim 2, wherein the current controlling device controls the switching control signal generating device to change the one-arm drive between one-arm drive using the first arm and one-arm driving using the second arm at the zero timing.

* * * * *